United States Patent [19]
Ichimura et al.

[11] Patent Number: 5,965,255
[45] Date of Patent: Oct. 12, 1999

[54] PRESSURE-SENSITIVE ADHESIVE SHEET FOR SURFACE PROTECTION

[75] Inventors: Syuji Ichimura; Yoshinaga Tsuzuki; Kinnosuke Hino, all of Tokyo, Japan

[73] Assignee: Nichiban Company Limited, Tokyo, Japan

[21] Appl. No.: 09/142,304

[22] PCT Filed: Mar. 6, 1997

[86] PCT No.: PCT/JP97/00693

§ 371 Date: Sep. 3, 1998

§ 102(e) Date: Sep. 3, 1998

[87] PCT Pub. No.: WO97/32721

PCT Pub. Date: Sep. 12, 1997

[30] Foreign Application Priority Data

Mar. 8, 1996 [JP] Japan .................................. 8-051818

[51] Int. Cl.$^6$ .............................. B32B 7/12; B32B 27/32
[52] U.S. Cl. ................. 428/353; 428/354; 428/355 EN; 428/355 BL; 428/355 AC; 428/516; 428/517
[58] Field of Search .................................... 428/353, 354, 428/355 EN, 355 BL, 355 AC, 516, 517

[56] References Cited

PUBLICATIONS

JP 55–139477 A Patent Abstract, Oct. 31, 1980.
JP 9–25466 A Patent Abstract, Jan. 28, 1997.

*Primary Examiner*—Daniel Zirker
*Attorney, Agent, or Firm*—Dike, Bronstein, Robert & Cushman, LLP; David G. Conlin

[57] ABSTRACT

The present invention provides a pressure-sensitive adhesive sheet for surface protection which has been laminated the following three layers of:

(A) a layer which contains 60–100% by weight of an elastomer, containing 100–50% by weight of a hydrogenated random copolymer consisting of 1–50% by weight of styrene and 99–50% by weight of a diene hydrocarbon and 0–50% by weight of a low-molecular-weight elastomer, and 40–0% by weight of a polyolefin;

(B) a layer which contains 3–95% by weight of a hydrogenated random copolymer consisting of 1–50% by weight of styrene and 99–50% by weight of a diene hydrocarbon and 97–5% by weight of a polyolefin; and (C) a layer which has at least one layer of a polyolefin, which has good adhesion to an object to be adhered, which can be easily removed (peeled off) from an object to be adhered after exposure to carbon arc, which has also good adhesion between the respective layers and which neither stains the surface to which the adhesive sheet is adhered nor leaves any adhesion mark thereon.

10 Claims, No Drawings

PRESSURE-SENSITIVE ADHESIVE SHEET FOR SURFACE PROTECTION

TECHNICAL FIELD

The present invention relates to a pressure-sensitive adhesive sheet for surface protection which protects metal surfaces, glass surfaces, coated surfaces, etc., and more particularly to a pressure-sensitive adhesive sheet for surface protection, which has good adhesion to an object to be adhered, which can be easily removed (peeled off) from an object to be adhered after exposure to carbon arc, which has also good adhesion between the respective layers and which neither stains the surface to which the adhesive sheet is adhered nor leaves any adhesion mark thereon.

BACKGROUND ART

As a conventional method for protecting a top coating on the body surface of a vehicle for which coating has been completed, there may be mentioned a method in which a paraffin wax is thinly coated thereon. However, this method involves such problems that it does not exhibit sufficient protecting function; it takes much time and labor to remove the paraffin wax; and the waste water produced at the time of its removal leads to environmental pollution.

Further, there are methods for applying directly a pressure-sensitive adhesive sheet for surface protection to metal surfaces, glass surfaces or coated surfaces, etc., as disclosed in Japanese Provisional Patent Publication No. 188579/1989 and Japanese Patent Publication No. 74627/1993, etc. This pressure-sensitive adhesive sheet is prepared by applying an adhesive solution to a plastic film followed by drying, or by co-extruding a substrate and an adhesive. However, the former involves a problem that it leads to an increase in costs, since the step of forming a film, the step of treating with an anchor coating agent, the step of applying an adhesive thereto, etc., are separate one another in many cases and yields are bad. On the other hand, the latter involves a problem that it does not have so good adhesion between the substrate and the adhesive agent and the adhesive remains on the surface of the an object to be adhered when the sheet is removed.

The purpose of the present invention is to provide a pressure-sensitive adhesive sheet for surface protection, which has good adhesion to an object to be adhered, which does not leave any stains and adhesion marks on an object to be adhered when the sheet is removed and which can easily be removed from an object to be adhered.

DISCLOSURE OF THE INVENTION

The present invention relates to a pressure-sensitive adhesive sheet for surface protection, wherein the following three layers (A), (B) and (C) have been laminated:

(A) a layer which contains 60–100% by weight of an elastomer, containing 100–50% by weight of a hydrogenated random copolymer consisting of 1–50% by weight of styrene and 99–50% by weight of a diene hydrocarbon and 0–50% by weight of a low-molecular-weight elastomer, and 40–0% by weight of a polyolefin;

(B) a layer which contains 3–95% by weight of a hydrogenated random copolymer, consisting of 1–50% by weight of styrene and 99–50% by weight of a diene hydrocarbon, and 97–5% by weight of a polyolefin; and (C) a layer which has at least one layer of a polyolefin.

BEST MODE FOR CARRYING OUT THE INVENTION

The present invention will be explained below in detail.
(1) Layer (A)

The layer (A) of the present invention is in contact with the layer (B), and is an adhesive layer which shows adhesion to an object to be adhered when it is in contact therewith.

The hydrogenated random copolymer employed in the layer (A) consisting of 1–50% by weight of styrene and 99–50% by weight of a diene hydrocarbon may preferably be a polymer of which the melt flow rate (determined in accordance with ASTM D1238 or JIS K7210, hereinafter abbreviated as "MFR") is 1–20 g/10 min. at 230° C. under a load of 2.16 kg. If the styrene content is less than 1% by weight, the resulting resin comes to have poor thermoplasticity, whereas if it is more than 50% by weight, the resulting copolymer comes to exhibit poor adhesion to an object to be adhered and poor heat resistance. The styrene content may preferably be 5–40% by weight. The hydrogenation degree may preferably be 90% or more, more preferably 95% or more. If the hydrogenation degree is less than 90%, the resulting copolymer may exhibit poor resistance to weather and reduced compatibility with a polyolefin. The diene hydrocarbon employable as a monomer for copolymerization includes, for example, isoprene, butadiene, etc.

Such hydrogenated random copolymer consisting of styrene and a diene hydrocarbon includes, for example, commercially available products such as DYNARON 1320P (hydrogenated random copolymer consisting of styrene and butadiene, styrene content: 10% by weight; MFR: 3.5 g/10 min. at 230° C. under a load of 2.16 kg, manufactured by Japan Synthetic Rubber Co., Ltd.), DYNARON 1910P (hydrogenated random copolymer consisting of styrene and butadiene, styrene content: 30% by weight; MFR: 5.3 g/10 min. at 230° C. under a load of 2.16 kg, manufactured by Japan Synthetic Rubber Co., Ltd.), etc.

The low-molecular-weight elastomer as employed in the layer (A) includes a low-molecular-weight polybutene, a low-molecular-weight polyisoprene, a low-molecular-weight polybutadiene, etc, and may preferably have a number-average molecular weight (determined in accordance with ASTM D 2503) of 4000 or less.

Such low-molecular-weight elastomer includes, for example, commercially available products such as IDEMITSU POLYBUTENE 300H (low-molecular-weight polybutene, number-average molecular weight: 1,500, manufactured by IDEMITSU Petrochemical Co., Ltd.), etc.

The amount to be added of the hydrogenated random copolymer and the low-molecular-weight elastomer may preferably be 0–35% by weight of the low-molecular-weight elastomer relative to 100–65% by weight of the hydrogenated random copolymer.

The polyolefin as employed in the layer (A) includes one of resins such as a polyethylene, a polypropylene, an ethylene/propylene copolymer, an ethylene/propylene/diene copolymer, an ethylene/1-butene copolymer, an ethylene/α-olefin copolymer, an ethylene/vinyl acetate copolymer, an ethylene/(meth)acrylic acid copolymer, an ethylene/methyl (meth)acrylate copolymer, an ethylene/ethyl (meth)acrylate copolymer, an ionomer resin having metallic ion bonds between polymers of which the main component is ethylene, an olefin crystal/ethylene-butylene/olefin crystal block copolymer and a low-molecular-weight amorphous α-olefin copolymer, etc., a blend of two or more thereof, or a polymer alloy thereof, and the polyolefin may preferably be a polymer in which the MFR is 0.1–60 g/10 min. at 230° C. under a load of 2.16 kg or 0.1–450 g/10 min. at 190° C. under a load of 2.16 kg, or the melt viscosity (determined by ASTM D3230) is 300–10,000 cps at 190° C.

Such a polyolefin includes, for example, commercially available products such as IDEMITSU POLYPRO F-794N (polypropylene, MFR: 7.0 g/10 min. at 230° C. under a load of 2.16 kg, manufactured by Idemitsu Petrochemical Co., Ltd.), ACRYFT WD201 (ethylene/methyl methacrylate copolymer, MFR: 2.0 g/10 min. at 190° C. under a load of 2.16 kg, manufactured by Sumitomo Chemical Co., Ltd.) and EVAFLEX 45x (ethylene/vinyl acetate copolymer, MFR: 95 g/10 min. at 190° C. under a load of 2.16 kg, manufactured by Mitsui Du Pont Polychemical Co., Ltd.), etc.

Regarding the composition of the layer (A), if the hydrogenated random copolymer consisting of styrene and a diene hydrocarbon in the elastomer composition is of less than 50% by weight and the low-molecular-weight elastomer is of more than 50% by weight, the layer exhibits too much adhesion to an object to be adhered and it becomes hard to remove sheets after a predetermined time and a part of the layer (A) remains on a surface of an object to be adhered. In addition, if sheets are wound on a roll, it becomes hard to unwind sheets due to blocking. Further, if the elastomer is of less than 60% by weight and the polyolefin is of more than 40% by weight, the layer exhibits poor adhesion to an object to be adhered. None of the cases are of any practical use as pressure-sensitive adhesive sheets for surface protection. Preferable embodiment may be of 65–100% by weight of the elastomer and 35–0% by weight of the polyolefin.

(2) Layer (B)

The layer (B) of the present invention is a primer layer which exists between the layers (A) and (C) and which allows both layers to adhere.

The same random copolymers as those explained in the preceding paragraph regarding the layer (A) are employable as the hydrogenated random copolymer consisting of styrene and diene hydrocarbon employed in the layer (B).

The same polyolefins as those explained in the preceding paragraph regarding the layer (A) are employable as the polyolefin employed in the layer (B).

In the composition of the layer (B), if the hydrogenated random copolymer consisting of styrene and diene hydrocarbon is of less than 3% by weight and the polyolefin is of more than 97% by weight, it comes to exhibit poor adhesion between the layers (A) and (B), and there are some cases where a portion of the layer (A) remains on an object to be adhered when sheets are removed after a predetermined period. On the other hand, if the polyolefin is of less than 5% by weight and the hydrogenated random copolymer consisting of styrene and diene hydrocarbon is of more than 95% by weight, it comes to exhibit poor adhesion between the layers (B) and (C), and there are some cases where portions of the layers (A) and (B) remain on an object to be adhered when sheets are removed after a predetermined period. None of the cases are of any practical use as pressure-sensitive adhesive sheets for surface protection.

(3) Layer (C)

The layer (C) of the present invention is a substrate layer which is in contact with the layer (B) and supports the adhesive sheet.

The same polyolefins as those explained in the preceding paragraph regarding the layer (A) are employable as the polyolefin employed in the layer (C), and different polyolefins may be employed in the form of multi-layers.

The thickness of each of the layers (A), (B) and (C) may preferably be 5–1,000 μm.

The above layers (A), (B) and (C) employed in the present invention may, as necessary, be incorporated with various additives, so long as the purpose of the present invention is not impaired. That is, a tackifier such as an aliphatic petroleum resin, an alicyclic resin, a rosin resin and a terpene resin; a softening agent such as an oil, a paraffin wax, an epoxy plasticizer and a polyester plasticizer; a pigment such as titanium dioxide; a filler such as talc and calcium carbonate; a lubricant such as stearic acid, stearic acid amide, calcium stearate, barium stearate and zinc stearate; a surfactant such as carboxylic acid type-, ether type- and phosphate ester type-surfactants; an antioxidant such as hindered phenol type-, phosphite type- and thioether type-antioxidants; an ultraviolet absorber or stabilizer such as a benzotriazole type-ultraviolet absorber, a hindered amine type-ultraviolet stabilizer and benzoate type-ultraviolet stabilizer; inorganic hollow particles such as glass balloon and silica balloon; a microspherical polymer such as acrylic microsphere and a high-molecular-weight polyolefin powder; and a releasant such as silicone type- and long-chain alkyl type-releasants, may be added as occasion demands.

The pressure-sensitive adhesive sheet for surface protection of the present invention may be prepared by a method of co-extruding the above layers (A), (B) and (C) simultaneously. Known methods such as blown-film extrusion method (inflation method) and T-die extrusion method can be used as a method for filming, and the method of co-extruding them simultaneously may be desirable from the view point of productivity and cost.

The pressure-sensitive adhesive sheet for surface protection of the present invention may be prepared from the respective materials by one step, when the layers (A), (B) and (C) are co-extruded simultaneously, which leads to high productivity. Further, since adhesive sheets can be prepared without using any solvent, it reduces costs and there causes no environmental problem. In addition, the adhesive layer (A) firmly adheres to the substrate layer (C) since the primer layer (B) also exists, and there is no fear that the adhesive layer (A) remains on a surface of an object to be adhered when sheets are removed.

In contrast thereto, pressure-sensitive adhesive sheets prepared by co-extruding only two layers of the adhesive layer (A) and the substrate layer (C), if the layer (A) does not contain the polyolefin, need to incorporate the hydrogenated random copolymer consisting of styrene and a diene hydrocarbon into the layer (C), in order to give adhesion between the layers (A) and (C). However, if sheets are wounded on a roll, a treatment for releasing is necessary since it becomes hard to unwind sheets due to blocking thereof.

The pressure-sensitive adhesive sheet for surface protection consisting of the layers (A), (B) and (C) of the present invention has solved these problems simply and skillfully.

EXAMPLES

The present invention will be explained more specifically by way of Examples, but it should never be limited to these Examples.

The components employed are as follows:

(1) a hydrogenated random copolymer consisting of styrene and a diene hydrocarbon (hereinafter abbreviated as "HSDR") HSDR-1: DYNARON 1320P (hydrogenated random copolymer consisting of styrene and butadiene, styrene content: 10% by weight; MFR: 3.5 g/10 min. at 230° C. under a load of 2.16 kg, manufactured by Japan Synthetic Rubber Co., Ltd.) HSDR-2: DYNARON 1910P (hydrogenated random copolymer consisting of styrene and butadiene, styrene content: 30% by weight; MFR: 5.3 g/10 min. at 230° C. under a load of 2.16 kg, manufactured by Japan Synthetic Rubber Co., Ltd.)

(2) a low-molecular-weight elastomer (hereinafter abbreviated as "LE")

LE-1: IDEMITSU POLYBUTENE 300H (low-molecular-weight polybutene, number-average molecular weight: 1,500, manufactured by Idemitsu Petrochemical Co., Ltd.)

(3) a polyolefin (hereinafter abbreviated as "PO")
PO-1: IDEMITSU POLYPRO F-794N (polypropylene, MFR: 7.0 g/10 min. at 230° C. under a load of 2.16 kg, manufactured by Idemitsu Petrochemical Co., Ltd.)
PO-2: ACRYFT WD201 (ethylene/methyl methacrylate copolymer, MFR: 2.0 g/10 min. at 190° C. under a load of 2.16 kg, manufactured by Sumitomo Chemical Co., Ltd.)
PO-3: EVAFLEX 45× (ethylene/vinyl acetate copolymer, MFR: 95 g/10 min. at 190° C. under a load of 2.16 kg, manufactured by Mitsui Du Pont Polychemical Co., Ltd.)
(4) additives (hereinafter abbreviated as "AD")
AD-1: ARKON P-100 (saturated alicyclic hydrocarbon resin, manufactured by Arakawa Chemical Kogyo Co., Ltd.)
AD-2: ADK CIZER PN-280 (adipic acid polyester plasticizer, manufactured by Asahi Denka Kogyo Co., Ltd.)
AD-3: KR-480 (rutile type titanium oxide pigment, manufactured by Titan Kogyo Co., Ltd.)
AD-4: MICROACE K-1 (talc, manufactured by Nippon Talc Co., Ltd.)
AD-5: STEARAMIDE (stearic acid amide, manufactured by Nakaraitesuku Co., Ltd.)
AD-6: TINUVIN 622LD (hindered amine ultraviolet stabilizer, manufactured by Ciba-Geigy Japan, Ltd.)
AD-7: IRGANOX 565 (hindered phenol antioxidant, Ciba-Geigy Japan, Ltd.)

Examples 1–6 and Comparative Examples 1–6

By using each composition as shown in Table 1, three layers (A), (B) and (C) were co-extruded by way of a T-die to obtain a laminated film having a total thickness of 60 μm, respective layers being of 10, 30 and 20 μm in thickness. Regarding Comparative Example 1, two layers film having a total thickness of 60 μm, where each of the layers (A) and (C) has 30 μm in thickness, was prepared by co-extrusion.

TABLE 1

| | | \multicolumn{13}{c}{(part by weight)} | | | | | | | | | | | | |
| | | HSDR | | LE | PO | | | AD | | | | | | |
| | Layer | HSDR-1 | HSDR-2 | LE-1 | PO-1 | PO-2 | PO-3 | AD-1 | AD-2 | AD-3 | AD-4 | AD-5 | AD-6 | AD-7 |
|---|---|---|---|---|---|---|---|---|---|---|---|---|---|---|
| Example 1 | (A) | 100 | — | — | — | — | — | — | — | — | — | — | 0.5 | 0.5 |
| | (B) | 20 | — | — | 80 | — | — | — | — | 10 | 10 | — | 0.1 | 0.1 |
| | (C) | — | — | — | 100 | — | — | — | — | 10 | 10 | 0.1 | 0.1 | 0.1 |
| Example 2 | (A) | 70 | — | 30 | — | — | — | — | — | — | — | — | 0.5 | 0.5 |
| | (B) | 20 | — | — | 80 | — | — | — | — | 10 | 10 | — | 0.1 | 0.1 |
| | (C) | — | — | — | 100 | — | — | — | — | 10 | 10 | 0.1 | 0.1 | 0.1 |
| Example 3 | (A) | 40 | — | 30 | 30 | — | — | 10 | — | — | — | — | 0.5 | 0.5 |
| | (B) | 80 | — | — | 20 | — | — | — | — | 10 | 10 | — | 0.1 | 0.1 |
| | (C) | — | — | — | 80 | 20 | — | — | — | 10 | 10 | 0.1 | 0.1 | 0.1 |
| Example 4 | (A) | 40 | 30 | 30 | — | — | — | — | — | — | — | — | 0.5 | 0.5 |
| | (B) | — | 80 | — | 20 | — | — | — | — | 10 | 10 | — | 0.1 | 0.1 |
| | (C) | — | — | — | 80 | 20 | — | — | — | 10 | 10 | 0.1 | 0.1 | 0.1 |
| Example 5 | (A) | 100 | — | — | — | — | — | 10 | 10 | — | — | — | 0.5 | 0.5 |
| | (B) | — | 80 | — | 10 | 10 | — | — | — | 10 | 10 | — | 0.1 | 0.1 |
| | (C) | — | — | — | 80 | 20 | — | — | — | 10 | 10 | 0.1 | 0.1 | 0.1 |
| Example 6 | (A) | 70 | — | — | — | — | 30 | 10 | — | — | — | — | 0.5 | 0.5 |
| | (B) | 20 | — | — | 60 | — | 20 | — | — | 10 | 10 | — | 0.1 | 0.1 |
| | (C) | — | — | — | 80 | 20 | — | — | — | 10 | 10 | 0.1 | 0.1 | 0.1 |

| | | \multicolumn{12}{c}{(part by weight)} | | | | | | | | | | |
| | | HSDR | | LE | PO | | AD | | | | | | |
| | Layer | HSDR-1 | HSDR-2 | LE-1 | PO-1 | PO-2 | AD-1 | AD-2 | AD-3 | AD-4 | AD-5 | AD-6 | AD-7 |
|---|---|---|---|---|---|---|---|---|---|---|---|---|---|
| Comparative Example 1 | (A) | 70 | — | 30 | — | — | — | — | — | — | — | 0.5 | 0.5 |
| | (B) | — | — | — | — | — | — | — | — | — | — | — | — |
| | (C) | — | — | — | 100 | — | — | — | 10 | 10 | 0.1 | 0.1 | 0.1 |
| Comparative Example 2 | (A) | 70 | — | 30 | — | — | — | — | — | — | — | 0.5 | 0.5 |
| | (B) | — | — | — | 80 | 20 | — | — | 10 | 10 | — | 0.1 | 0.1 |
| | (C) | — | — | — | 100 | — | — | — | 10 | 10 | 0.1 | 0.1 | 0.1 |
| Comparative Example 3 | (A) | 70 | — | 30 | — | — | — | — | — | — | — | 0.5 | 0.5 |
| | (B) | 80 | 20 | — | — | — | — | — | 10 | 10 | — | 0.1 | 0.1 |
| | (C) | — | — | — | 100 | — | — | — | 10 | 10 | 0.1 | 0.1 | 0.1 |
| Comparative Example 4 | (A) | 40 | — | — | 60 | — | — | — | — | — | — | 0.5 | 0.5 |
| | (B) | 20 | — | — | 80 | — | — | — | 10 | 10 | — | 0.1 | 0.1 |
| | (C) | — | — | — | 100 | — | — | — | 10 | 10 | 0.1 | 0.1 | 0.1 |
| Comparative Example 5 | (A) | 30 | — | 70 | — | — | — | — | — | — | — | 0.5 | 0.5 |
| | (B) | 20 | — | — | 80 | — | — | — | 10 | 10 | — | 0.1 | 0.1 |
| | (C) | — | — | — | 100 | — | — | — | 10 | 10 | 0.1 | 0.1 | 0.1 |
| Comparative Example 6 | (A) | 100 | — | — | — | — | — | — | — | — | — | 0.5 | 0.5 |
| | (B) | 20 | — | — | 80 | — | — | — | 10 | 10 | — | 0.1 | 0.1 |
| | (C) | 30 | — | — | 70 | — | — | — | 10 | 10 | 0.1 | 0.1 | 0.1 |

The resulting pressure-sensitive adhesive sheets for surface protection were applied to coated surfaces, stainless steel sheets and glass plates to test their adhesion properties to an object to be adhered and weathering resistance. In addition, blocking after 30 days of winding on a roll and adhesion between the three layers were evaluated. It should be noted here that weathering resistance of each film was tested after carbon arc exposure for 300 hours in a weatherometer in terms of removability and of presence or absence of stains or adhesion marks remaining on a surface to which the adhesion sheet had been applied. Further, the residue of the layers (A) and (B) as a result of removing after carbon arc exposure for 300 hours was evaluated in terms of adhesion between the three layers. The test results are shown in Table 2.

TABLE 2

|  | | Weathering resistance | | | |
| --- | --- | --- | --- | --- | --- |
|  | Adhesion to an object to be adhered | Removability | Contamination and trace on an object to be adhered | Blocking in the rolling form | adhesion between three layers |
| Example 1 | Good | Good | Nil | Nil | Good |
| Example 2 | Good | Good | Nil | Nil | Good |
| Example 3 | Good | Good | Nil | Nil | Good |
| Example 4 | Good | Good | Nil | Nil | Good |
| Example 5 | Good | Good | Nil | Nil | Good |
| Example 6 | Good | Good | Nil | Nil | Good |
| Comparative Example 1 | Good | Good | Occurred | Nil | Poor |
| Comparative Example 2 | Good | Good | Occurred | Nil | Poor |
| Comparative Example 3 | Good | Good | Occurred | Nil | Poor |
| Comparative Example 4 | Poor | — | — | Nil | Good |
| Comparative Example 5 | Good | Poor | Occurred | Occurred | Good |
| Comparative Example 6 | Good | Good | Nil | Occurred | Good |

As is clear from the results of Examples 1–6, the pressure-sensitive adhesive sheet for surface protection of the present invention exhibited excellent adhesion to an object to be adhered, and they could remove easily from an object to be adhered after carbon arc exposure and did not contaminate an object to be adhered nor leave thereon any traces of the films removed. Further, blocking was not serious when sheets were wound, and there was no problem when sheets were unwound.

On the other hand, in the case of the two layer film which lacks the layer (B), as in Comparative Example 1, it showed poor adhesion between the layers (A) and (C), and a portion of the layer (A) remained on an object to be adhered after the weathering resistance test was carried out.

Further, in the case where the layer (B) composition did not contain HSDR, as in Comparative Example 2, it showed poor adhesion between the layers (A) and (B), and a portion of the layer (A) remained on an object to be adhered after the weathering resistance test was carried out.

On the other hand, in the case where the layer (B) composition did not contain a polyolefin, as Comparative Example 3, it showed poor adhesion between the layers (B) and (C), and a portion of the layers (A) and (B) remained on an object to be adhered after the weathering resistance test was carried out.

Further, in the case where the rate of the polyolefin in the layer (A) composition was higher than the range of the present invention, as in Comparative Example 4, it showed poor adhesion to an object to be adhered. Accordingly, the weathering resistance test could not be carried out.

Furthermore, in the case where the rate of the low-molecular-weight elastomer in the layer (A) composition was higher than the range of the present invention, as in Comparative Example 5, it was hard to remove after the weathering resistance test was carried out, and a portion of the layer (A) remained on an object to be adhered by cohesive failure. Further, when sheets were wound in the form of roll, it was fairly hard to unwind sheets since blocking was serious.

Further, in the case where the layer (C) composition contained the hydrogenated random copolymer consisting of styrene and a diene hydrocarbon, as in Comparative Example 6, when sheets were wound on a roll, it was fairly hard to unwind sheets since blocking was serious.

As mentioned above, the products in Comparative Examples 1–6 are not of practical use as an adhesive sheet for surface protection.

INDUSTRIAL APPLICABILITY

The pressure-sensitive adhesive sheet for surface protection of the present invention has good adhesion to an object to be adhered, and does not contaminate an object to be adhered nor leave thereon any traces when it is removed from an object to be adhered, and can be removed easily from an object to be adhered, by using a hydrogenated random copolymer consisting of styrene and a diene hydrocarbon as a component of the adhesive layer. Further, by sandwiching the primer layer between the adhesive layer and the substrate layer, it renders adhesion between both layers good, while it does not render blocking in the rolling form serious. In addition, it is possible to co-extrude the adhesive layer, the primer layer and the substrate layer simultaneously, and in this case, the pressure-sensitive adhesive sheet for surface protection can be prepared from the material resins by one step, which is also excellent from the view point of productivity and cost.

We claim:

1. A pressure-sensitive adhesive sheet for surface protection, wherein the following three layers (A), (B) and (C) have been laminated:

(A) a layer which contains 60–100% by weight of an elastomer, containing 100–50% by weight of a hydrogenated random copolymer consisting of 1–50% by weight of styrene and 99–50% by weight of a diene hydrocarbon and 0–50% by weight of a low-molecular-weight elastomer, and 40–0% by weight of a polyolefin;

(B) a layer which contains 3–95% by weight of a hydrogenated random copolymer consisting of 1–50% by weight of styrene and 99–50% by weight of a diene hydrocarbon and 97–5% by weight of a polyolefin; and (C) a layer which has at least one layer of a polyolefin.

2. The pressure-sensitive adhesive sheet for surface protection according to claim 1, wherein said three layers (A), (B) and (C) have been laminated by co-extrusion.

3. The pressure-sensitive adhesive sheet for surface protection according to claim 1, wherein said diene hydrocarbon of said hydrogenated random copolymer employed in each of layers (A) and (B) is butadiene.

4. The pressure-sensitive adhesive sheet for surface protection according to claim 2, wherein said diene hydrocarbon of said hydrogenated random copolymer employed in each of layers (A) and (B) is butadiene.

5. The pressure-sensitive adhesive sheet for surface protection according to claim 1, wherein the melt flow rate of the hydrogenated random copolymer employed in each of layers (A) and (B) is 1–20 g/10 min. at 230° C. under a load of 2.16 kg.

6. The pressure-sensitive adhesive sheet for surface protection according to claim 4, wherein the melt flow rate of the hydrogenated random copolymer employed in each of layers (A) and (B) is 1–20 g/10 min. at 230° C. under a load of 2.16 kg.

7. The pressure-sensitive adhesive sheet for surface protection according to claim 1, wherein the melt flow rate of the polyolefin employed in each of said three layers (A), (B) and (C) is 0.1–450 g/10 min. at 190° C. under a load of 2.16 kg or 0.1–60 g/10 min. at 230° C. under a load of 2.16 kg and the melt viscosity is 300–10,000 cps at 190° C.

8. The pressure-sensitive adhesive sheet for surface protection according to claim 6, wherein the melt flow rate of the polyolefin employed in each of said three layers (A), (B) and (C) is 0.1–450 g/10 min. at 190° C. under a load of 2.16 kg or 0.1–60 g/10 min. at 230° C. under a load of 2.16 kg and the melt viscosity is 300–10,000 cps at 190° C.

9. The pressure-sensitive adhesive sheet for surface protection according to claim 1, wherein said polyolefin employed in the three layers (A), (B) and (C) includes at least one selected from the group consisting of a polyethylene, a polypropylene, an ethylene/propylene copolymer, an ethylene/propylene/diene copolymer, an ethylene/1-butene copolymer, an ethylene/α-olefin copolymer, an ethylene/vinyl acetate copolymer, an ethylene/(meth)acrylic acid copolymer, an ethylene/methyl (meth)acrylate copolymer, an ethylene/ethyl (meth)acrylate copolymer, an ionomer resin having metallic ion bonds between polymers of which the main component is ethylene, an olefin crystal/ethylene-butylene/olefin crystal block copolymer and a low-molecular-weight amorphous α-olefin copolymer.

10. The pressure-sensitive adhesive sheet for surface protection according to claim 1, wherein said low-molecular-weight elastomer employed in the layer (A) is a low-molecular-weight polybutene, a low-molecular-weight polyisoprene or a low-molecular-weight polybutadiene, which has a number-average molecular weight (determined in accordance with ASTM D 2503) of 4,000 or less.

* * * * *